US012386611B2

(12) United States Patent
Roy et al.

(10) Patent No.: US 12,386,611 B2
(45) Date of Patent: Aug. 12, 2025

(54) SOFTWARE BUNDLE CONTROL FRAMEWORK

(71) Applicant: Dell Products L.P., Round Rock, TX (US)

(72) Inventors: Mainak Roy, Bangalore (IN); Rathi Babu, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 261 days.

(21) Appl. No.: 18/337,186

(22) Filed: Jun. 19, 2023

(65) Prior Publication Data
US 2024/0419440 A1    Dec. 19, 2024

(51) Int. Cl.
G06F 8/71    (2018.01)
G06F 21/57   (2013.01)

(52) U.S. Cl.
CPC .............. *G06F 8/71* (2013.01); *G06F 21/577* (2013.01); *G06F 2221/033* (2013.01)

(58) Field of Classification Search
CPC ..... G06F 8/71; G06F 21/577; G06F 2221/033
USPC ........................................................ 726/25
See application file for complete search history.

(56) References Cited

U.S. PATENT DOCUMENTS

| 2005/0034121 A1* | 2/2005 | Fisher ...................... G06F 8/61 717/169 |
| 2008/0052663 A1* | 2/2008 | Cope ...................... G06F 21/10 717/101 |
| 2024/0385823 A1* | 11/2024 | Hoole ...................... G06F 8/65 |

OTHER PUBLICATIONS

Gorp, How to Easily Create an API With Akana, Feb. 7, 2023, https://www.akana.com/blog/create-api (Year: 2023).*

(Continued)

*Primary Examiner* — Zi Ye
(74) *Attorney, Agent, or Firm* — Ryan, Mason & Lewis, LLP

(57) ABSTRACT

A method comprises receiving a request for a software bundle, the request comprising one or more specifications for the software bundle, and searching, using one or more automated scripts, a network comprising one or more open-source software providers and one or more open-source software information sources for open-source software versions meeting the one or more specifications and for information corresponding to the open-source software versions. One or more values corresponding to at least one of stability and security of the software versions are computed based on the information, and one or more of the software versions are identified for inclusion in the software bundle based on the one or more values. The one or more of the software versions are combined with at least a portion of legacy software to generate the software bundle. One or more application programming interfaces are defined and added to the software bundle.

20 Claims, 9 Drawing Sheets

(56) References Cited

OTHER PUBLICATIONS

Valgrind, Source Code Repository, May 26, 2022, https://web.archive.org/web/20220526142226/https://valgrind.org/downloads/repository.html (Year: 2022).*

Computer Science Wiki, "Web Crawler Functions," https://computersciencewiki.org/index.php?title=Web_crawler_functions&oldid=10264, Nov. 14, 2019, 4 pages.

First, "Common Vulnerability Scoring System SIG," https://www.first.org/cvss/, Accessed Jun. 6, 2023, 2 pages.

Wikipedia, "Open-Source Software," https://en.wikipedia.org/w/index.php?title=Open-source_software&oldid=1158672054, Jun. 5, 2023, 19 pages.

A. S. Gillis et al., "Common Vulnerability Scoring System (CVSS)," https://www.techtarget.com/searchsecurity/definition/CVSS-Common-Vulnerability-Scoring-System, Apr. 2023, 6 pages.

\* cited by examiner

| Product (internal code name/project) | Component (Name of code component) | Version of Code Component | Deployment Model (Internal, external, client, server, etc.) | License (Identity and location of license that applies to code component) | Stability Index | Security Index | Time from Last Version | Sentiment Scale |
|---|---|---|---|---|---|---|---|---|
| iDRAC9 | apache2 | 2.4.16 | External | Apache-2.0 | 75 | 40 | 0.5 | -7 |
| iDRAC9 | apr | 1.5.2 | External | Apache-2.0 | 65 | 80 | 1 | 5 |
| iDRAC9 | apr-util | 1.5.4 | External | Apache-2.0 | 70 | 80 | 0.75 | 7 |
| iDRAC9 | argtable | 2.13 | External | GPLv2+ | 55 | 90 | 0.5 | -3 |
| iDRAC9 | avahi | 0.6.31 | External | GPLv2+ LGPLv2.1+ | 40 | 90 | 0.5 | 2 |

FIG. 4

SOFTWARE BUNDLE CONTROL FRAMEWORK

FIELD

The field relates generally to information processing systems, and more particularly to management of software bundles in information processing systems.

BACKGROUND

Datacenters may implement combinations of open-source software with legacy software. Since users may be comfortable with and accustomed to legacy software, and some open-source software may not have all of the features and/or services offered by the legacy software, it can be beneficial to maintain the legacy software in addition to the open-source software.

Currently, there are no systems in place to determine which combinations of open-source software and legacy software should be implemented for a given datacenter. As a result, significant time and resources are wasted when attempting to determine datacenter software configurations.

SUMMARY

Embodiments provide a software bundle management platform in an information processing system.

For example, in one embodiment, a method comprises receiving a request for a software bundle, wherein the request comprises one or more specifications for the software bundle, and searching, using one or more automated scripts, a network comprising one or more open-source software providers and one or more open-source software information sources for open-source software versions meeting the one or more specifications and for information corresponding to the open-source software versions. In the method, one or more values corresponding to at least one of stability and security of the open-source software versions are computed based at least in part on the information, and one or more of the open-source software versions to be included in the software bundle are identified based at least in part on the one or more values. The method further comprises combining the one or more of the open-source software versions with at least a portion of legacy software to generate the software bundle, and defining and adding one or more application programming interfaces to the software bundle based at least in part on the one or more specifications. The software bundle is transmitted over the network to one or more user devices.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 4 depicts a table including data for various instances of open-source software in an illustrative embodiment.

DETAILED DESCRIPTION

Figure 1:
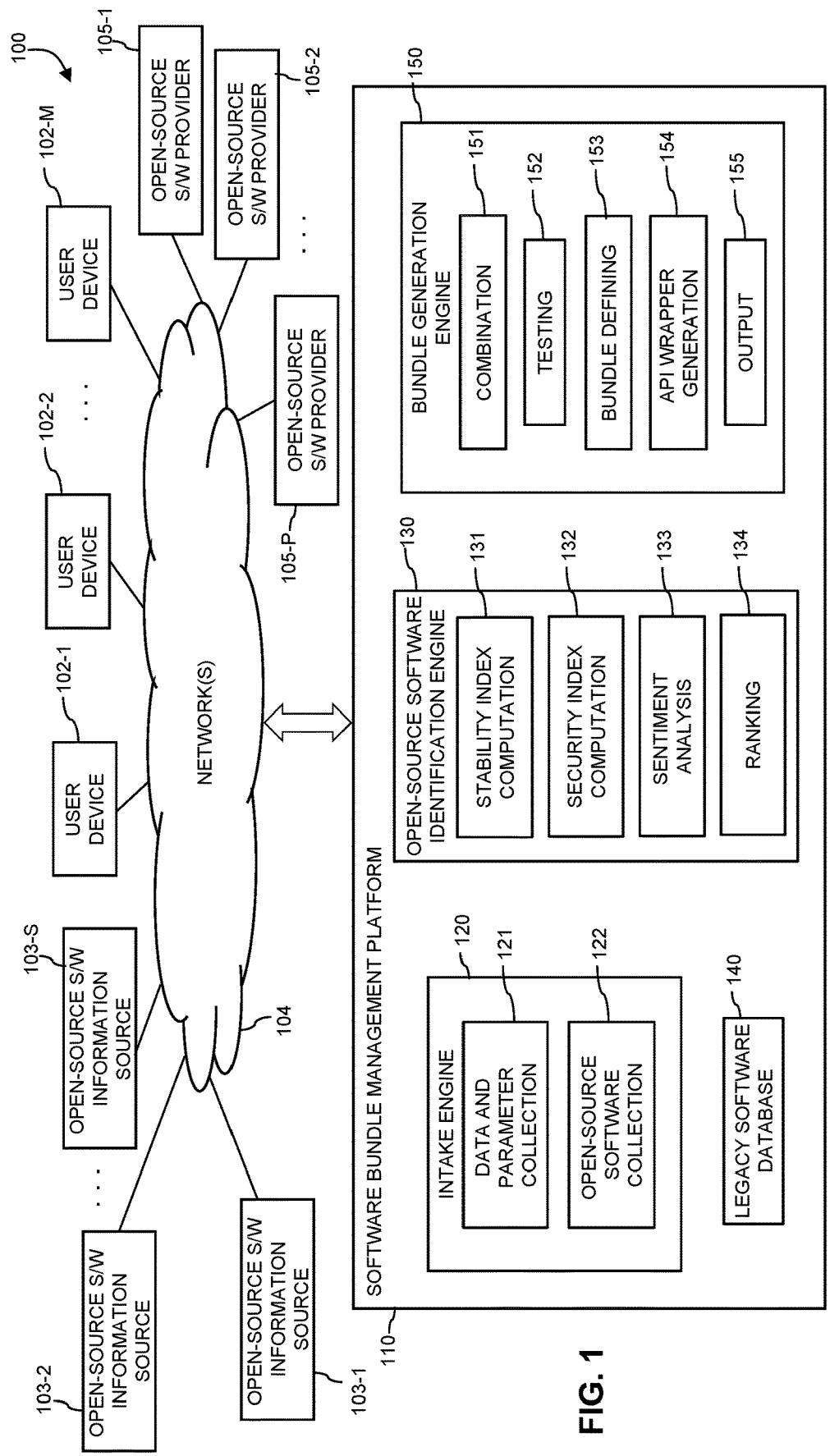
FIG. 1 depicts an information processing system with a software bundle management platform in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "application programming interface (API)" or "interface" refers to a set of subroutine definitions, protocols, and/or tools for building software. Generally, an API defines communication between software components. APIs permit programmers to write software applications consistent with an operating environment or website. APIs are used to integrate and pass data between applications, and may be implemented on top of other systems.

FIG. 1 shows an information processing system 100 configured in accordance with an illustrative embodiment. The information processing system 100 comprises user devices 102-1, 102-2 . . . 102-M (collectively "user devices 102") and open-source software (S/W) providers 105-1, 105-2 . . . 105-P (collectively "open-source software providers 105"). The user devices 102 and open-source software providers 105 communicate over a network 104 with a software bundle management platform 110. The variable M and other similar index variables herein such as K. L. S and P are assumed to be arbitrary positive integers greater than or equal to one.

The user devices 102 and one or more devices of the open-source software providers 105 can comprise, for example, Internet of Things (IoT) devices, desktop, laptop or tablet computers, mobile telephones, or other types of processing devices capable of communicating with the software bundle management platform 110 over the network 104. Such devices are examples of what are more generally referred to herein as "processing devices." Some of these processing devices are also generally referred to herein as "computers." The user devices 102 and one or more devices of the open-source software providers 105 may also or alternately comprise virtualized computing resources, such as virtual machines (VMs), containers, etc. The user devices 102 and/or one or more devices of the open-source software providers 105 in some embodiments comprise respective computers associated with a particular company, organization or other enterprise.

The terms "customer," "administrator." "personnel" or "user" herein are intended to be broadly construed so as to encompass numerous arrangements of human, hardware, software or firmware entities, as well as combinations of such entities. Software bundle management services may be provided for users utilizing one or more machine learning models, although it is to be appreciated that other types of infrastructure arrangements could be used. At least a portion of the available services and functionalities provided by the software bundle management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the software bundle management platform 110, as well as to support communication between the software bundle management platform 110 and connected devices (e.g., user devices 102 and one or more devices of the open-source software providers 105) and/or other related systems and devices not explicitly shown.

In some embodiments, the user devices 102 are assumed to be associated with repair technicians, system administrators, information technology (IT) managers, software developers, release management personnel or other authorized personnel configured to access and utilize the software bundle management platform 110. The user devices 102 can also be respectively associated with one or more customers requiring open-source software. As used herein, "open-source software" is to be broadly construed to refer to, for example, computer software that is released under a license where users have rights to, for example, freely use, study, change and distribute the software and its source code. Open-source software may be developed in a collaborative and public manner by multiple contributors.

As used herein, "legacy software" is to be broadly construed to refer to, for example, existing applications, programs or other software that may still be in use. In some instances, newer versions of the legacy software may be available and the legacy software may not necessarily be supported on certain hardware and environments. The term legacy software as used herein includes, for example, proprietary software of an entity, such as, for example, proprietary software of an enterprise.

As noted hereinabove, there are technical problems with configuring combinations of open-source software and legacy software for datacenters and other types of platforms. For example, servers may be configured with proprietary software that is needed to perform functions that open-source software is unable to perform. In addition, enterprises may choose to maintain legacy software since there are features of the legacy software that users prefer over those of open-source software. With current approaches, significant time and resources are wasted when identifying which portions and versions of open-source and legacy software to use in software bundles and to optimize performance.

In order to address the problems with current approaches, illustrative embodiments provide an automated framework for the generation of software bundles for computing environments. Advantageously, the illustrative embodiments provide techniques for analyzing features and specifications of a computing environment (e.g., a datacenter), computing stability indices for open-source software versions and computing security indices for open-source software versions using common vulnerability scoring system (CVSS) scores. Based on the computing environment features and specifications and the stability and security indices, a software bundle package balancing portions of legacy and open-source software is generated. The embodiments implement a generated software package in a given computing environment by creating and implementing one or more application programming interface (API) protocols.

The software bundle management platform 110 in the present embodiment is assumed to be accessible to the user devices 102 and/or one or more devices of the open-source software providers 105 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the software bundle management platform 110 includes an intake engine 120, an open-source software identification engine 130, a legacy software database 140 and a bundle generation engine 150. The intake engine 120 includes a data and parameter collection layer 121 and an open-source software collection layer 122. The open-source software identification engine 130 includes a stability index computation layer 131, a security index computation layer 132, a sentiment analysis layer 133 and a ranking layer 134. The bundle generation engine 150 includes a combination layer 151, a testing layer 152, a bundle defining layer 153, an application programming interface (API) wrapper generation layer 154 and an output layer 155.

Figure 2:
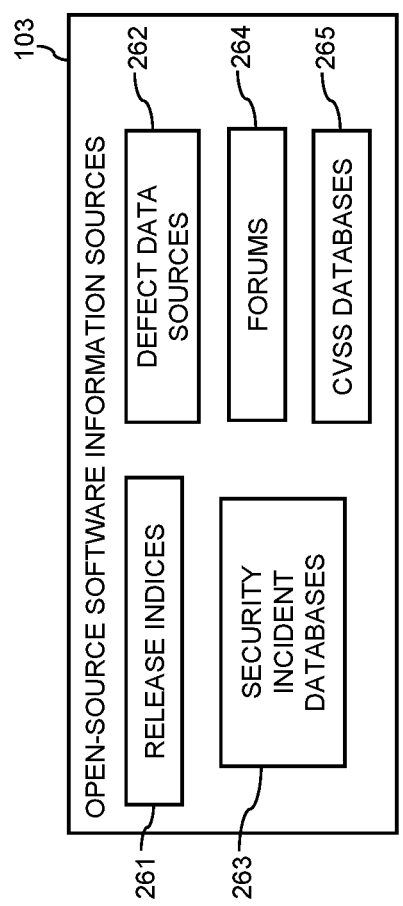
FIG. 2 depicts example open-source software information sources according to an illustrative embodiment.

The data and parameter collection layer 121 of the intake engine 120 collects computing environment parameters from one or more user devices 102 and open-source software data from one or more open-source software (S/W) information sources 103-1, 103-2, . . . 103-S (collectively "open-source software information sources 103"). Referring to FIG. 2, in a non-limiting illustrative embodiment, the open-source software information sources 103 comprise, for example, one or more of release indices 261, defect data sources 262, security incident databases 263, forums 264 and common vulnerability scoring system (CVSS) databases 265.

The data and parameter collection layer 121 of the intake engine 120 receives and processes, for example, information associated with the computing environment in which a software bundle is to be implemented. The information includes, but is not necessarily limited to, operating system details (e.g., Linux and/or Windows specifications and versions), server and other computing device details (e.g., memory, storage, existing applications), details of load and other parameters (e.g., networks, protocols, APIs), designated applications and desired actions (e.g., functions that the software bundle is to perform). In one or more embodiments, the intake engine 120 performs delta (∆) analysis across data sets to compare data values between multiple objects over a designated time interval or for a single object over multiple (e.g., equivalent) time intervals. As a result, differences between data series (delta) can be analyzed. As explained in more detail herein, once a software bundle is generated, intake engine 120 performs a delta analysis on variations between different combinations of intake data and parameters, as well as between different software bundles that may include different combinations of portions and versions of open-source software and legacy software.

In illustrative embodiments, the intake engine 120 receives a request for a software bundle from one or more users (e.g., via one or more user devices 102). The request comprises specifications for the software bundle such as, for example, operating system parameters, device specifications and functions to be performed by the software bundle. In illustrative embodiments, using one or more automated scripts, the open-source software collection layer 122 systematically searches (e.g., crawls) the network 104 comprising the open-source software providers 105 for open-source software versions and/or products meeting the specifications. In addition, using one or more automated scripts, the data and parameter collection layer 121 systematically searches (e.g., crawls) the network 104 comprising the open-source software information sources 103 for information corresponding to the open-source software versions and/or products.

For example, in connection with computing a stability index of the open-source software versions and/or products meeting the specifications, the stability index computation layer 131 of the open-source software identification engine 130 uses information from release indices 261, defect data sources 262 and/or forums 264. In more detail, the stability index is a number which defines how software behaves in terms of reported defects over the course of use of a version. For example, a software package launched as version 1.0 will typically have a low stability index as it has no proven stability data. Release details for each open-source distribution are provided in the release indices 261. A release index lists the open-source software versions that have been released and the time period when the versions were released. A version stability model is created from the version releases. For example, a version 1.0.0 may have a stability index of "0" which means it has the highest probability of being unstable. For each minor release (e.g., 1.2.1), the stability index may improve based on or more factors.

In illustrative embodiments, computing a stability index for respective ones of open-source software versions is based at least in part on a number of open issues corresponding to the respective ones of the open-source software versions. In more detail, the number of open issues between 2 versions may be computed based on the following formula (1):

Open Issues=Open issues on previous version−Issues fixed on subsequent version+Issues raised on subsequent version (1)

For example, in a non-limiting operational example, if the open issues on version 1.0.0=15, the issues fixed on version 1.0.1=5 and the new issues raised on version 1.0.1=2, the number of open issues following version 1.0.1=15-5+2=12. Then, if the issues fixed on version 1.1.0=11, and the new issues raised on version 1.1.0=3, then the number of open issues following version 1.1.0=12-11+3=4.

From the above non-limiting operational example, the stability index, which is based on the number of open issues, increased with each version change. In accordance with illustrative embodiments, as a result of the crawling, the data and parameter collection layer 121 collects open-source software version release information from the release indices 261 and collects information on whether issues for the open-source software versions have been raised or fixed from the defect data sources 262 and/or forums 264. In some cases, statistical ranges for whether issues have been raised or fixed are collected, and the average number of issue fixes versus the average number of raised issues are computed for each version.

In some embodiments, the stability index computation layer 131 determines whether a number of open issues for a given version is less than a threshold number of open issues. If the number of open issues is less than the threshold number, the stability index will be increased by a designated amount. In some cases, the stability index may be inversely proportional to the number of raised issues, such that as the number of issues raised increases, the stability index is reduced. In one or more embodiments, the stability index can be computed based on the following formula (2), where N corresponds to a release version:

Stability Index$_N$=Stability Index$_{N-1}$+(Number of fixed issues$_N$−Issues fixed threshold)+(Raised issues threshold−number of issues raised$_N$) (2)

The thresholds may change over time. The stability index provides data on whether the stability of open-source software has increased or decreased. In some embodiments, the stability index computation layer 131 may factor in an automatic decrease in the stability index of a given version for any major version changes (e.g., from 1.x to 2.x, as opposed to from 1.x to 1.y). The automatic reduction can be, for example, 50%, but the embodiments are not necessarily limited thereto.

In connection with computing a security index of the open-source software versions and/or products meeting the request specifications, the security index computation layer 132 of the open-source software identification engine 130 uses information from security incident databases 263 and/or CVSS databases 265. In more detail, the security index is a number which is tied to security issues reported over the course of use of a version. For example, the security index is calculated based on reported security incidents. For example, in illustrative embodiments, the security index is calculated based on: (i) a number of reported security issues per version release; and (ii) respective criticalities of the security issues, which are determined from, for example, CVSS scores. The security index is dynamic and requires continuous monitoring (e.g., crawling) of security incident databases 263 and/or CVSS databases 265. The common vulnerability scoring system (CVSS) is a public framework for rating the severity of security vulnerabilities in software. The framework is application- and vendor-neutral. The CVSS framework is used to score vulnerabilities for multiple types of software products, including, but not necessarily limited to operating systems, databases, and web applications. The CVSS framework is maintained by the Forum of Incident Response and Security Teams (FIRST), which is a nonprofit organization having more than 500 members. CVSS scores are calculated using a formula that includes vulnerability-based metrics. A CVSS score ranges from zero to 10, with zero representing a lowest severity of a security vulnerability and 10 representing a highest severity of a security vulnerability.

In illustrative embodiments, when a security issue is reported for a given version, based on the criticality of the issue, the security index may be reduced. If a new open-source software version is released, the security index will be revised. According to one or more embodiments, the security index for a given version can start at 100 and if any issues are reported, the security index of that version may be reduced. An administrator may designate which security incident databases 263 can be used to scan for reported incidents.

A sentiment analysis layer 133 performs sentiment analysis to determine acceptance of open-source software versions and/or products by users. Such information on the acceptance may be accumulated from, for example, forums 264 (e.g., message boards, question and answer sites, social media sites, review sites, etc.) where the open-source software versions and/or products are discussed and commentary is provided. For example, referring to blocks 301 and 302 of the operational flow 300 in FIG. 3, text from the forums 264 is parsed and filtered to remove common words, and clean any unwanted characters and stop words. In some cases, the filtering may include stemming and lemmatization, as well as changing text to lower case, removing punctuation, and removing incorrect or unnecessary characters. The input data may be tokenized using, for example, a Keras library or a natural language toolkit (NLTK) library. A Keras tokenizer class can be used to index the tokens.

Referring to block 303, key word and/or key phrase mapping is performed where one or more terms and/or one or more phrases used by one or more users to describe the open-source software versions and/or products are compared to one or more designated key terms and/or one or more designated key phrases. Referring to block 304, sentiments are classified by deriving a positive sentiment or negative sentiment for respective ones of the open-source software versions and/or products based on the comparing. For example, if a threshold number of terms and/or phrases used by the one or more users matches with designated key positive terms or key positive phrases, then a positive sentiment is indicated. The designated positive key terms or phrases may have, for example, some positive connotation (e.g., "approve," "satisfied," "superior," "good," "great," "recommend," etc.). Conversely, if a threshold number of terms and/or phrases used by the one or more users matches with designated key negative terms or key negative phrases, then a negative sentiment is indicated. The designated negative key terms or phrases may have, for example, some negative connotation (e.g., "disapprove," "unsatisfied," "inferior," "bad," "terrible," "not recommend," etc.), In some embodiments, the sentiment classification (block 304) is performed by retrieving from the open-source software information sources 103 (e.g., forums 264) data corresponding to a number of positive indications (e.g., likes) and a number of negative indications (e.g., dislikes) for respective ones of the open-source software versions and/or products, and computing a fulfillment value based at least in part on the number of positive indications and the number of negative indications. A higher number of positive indications is related to a positive sentiment. In some embodiments, if a particular number of positive indications exceeds a threshold, that particular number indicates a positive sentiment, if a particular number of negative indications exceeds a threshold, that particular number indicates a negative sentiment.

Additionally or alternatively, sentiment classification (block 304) can be based on whether users are inclined to use a given open-source software version and/or products. User inclination can relate to which products of the same or similar type are being consumed by a greater number of users (e.g., based on download counts and relevant demographic spreads). For example, data corresponding to a number of downloads for respective ones of the open-source software versions is retrieved from the open-source software information sources 103 and/or from the open-source software providers 105, and inclination values are computed based at least in part on the number of downloads, wherein a higher inclination value is related more downloads and a positive sentiment, and a lower inclination value is related to less downloads and a negative sentiment. In some embodiments, if a particular number of downloads exceeds a threshold, that particular number indicates a positive sentiment, and if the particular number does not exceed the threshold, a negative sentiment is concluded.

Usage metrics, including how often an open-source software product is updated and the number of downloads for different versions of the same product may also be factors for the sentiment analysis. For example, in an illustrative embodiment, larger numbers of updates and downloads of different versions of the same product (e.g., exceeding designated thresholds) result in positive sentiments.

Figure 3:
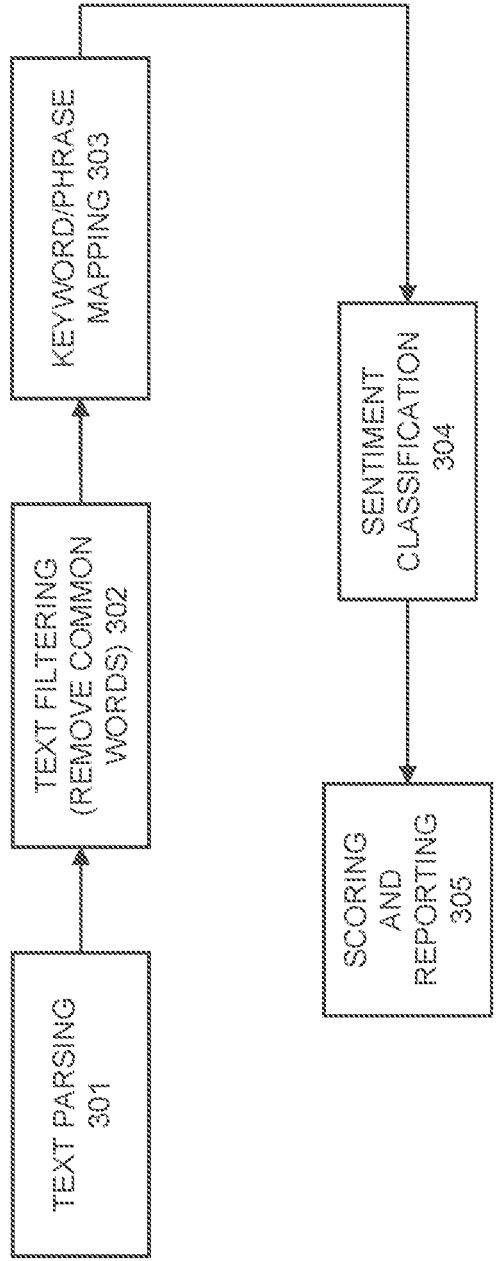
FIG. 3 depicts an operational flow for sentiment analysis in an illustrative embodiment.

Referring to block 305 of FIG. 3, the open-source software versions and/or products are given scores based on the classified sentiments and a report can be generated for one or more users and/or for use by the ranking layers 134 and/or the bundle generation engine 150. The scores may be proportional to the number of positive sentiments, resulting in higher scores for a higher number of positive sentiments. In illustrative embodiments, a sentiment scale is used to define the sentiment ranging from negative to neutral to positive. In a non-limiting operational example, if the scale ranges from −10 to +10, −10 indicates the most negative sentiment, 0 indicates a neutral (neither positive nor negative) sentiment and +10 indicates the most positive sentiment. The level of sentiment in the scale is defined based on, for example, the number of positive and negative sentiments for a given open-source software version or product that have been identified based on the analysis by the sentiment analysis layer 133.

A ranking layer 134 ranks the open-source software versions and/or products based at least in part on their corresponding stability index, security index and/or sentiment score (e.g., on a sentiment scale). For example, referring to the table 400 in FIG. 4, for a given product (iDRAC9), stability index, security index and sentiment scale values for different code components are depicted. The table 400 further includes data corresponding to time elapsed since the last version of the code component, license information for the code component, the deployment model for the code component and the version of the code component. The ranking layer 134 can sort the code components based on or more of the categories in the table 400, giving the same or different weights to the categories based on the computing environment specifications or on designated criteria. In generating the ranking, the ranking layer 134 may apply one or more key performance indicators (KPIs) of an enterprise, which can be specified by a user when requesting the software bundle. The KPIs specify what outcomes the enterprise wants to achieve with the software bundle, and time for achieving such outcomes. For example, in an operations scenario, KPIs may indicate average time to fill orders, PaaS or SaaS time-to-market, customer and employee satisfaction, inventory turnover, etc. The ranking layer 134 will use these KPIs in combination with software performance data and user comments to identify which software versions are best-suited to achieve the KPIs.

The open-source software identification engine 130 identifies one or more open-source software versions to be included in the software bundle based at least in part on the computed stability and security indices and the sentiment analysis. In illustrative embodiments, the identification is based on the ranking formed by the ranking layer 134.

Taking the identified open-source software versions from the open-source software identification engine 130 and an inventory of legacy software for the computing environment for which the software bundle is being generated from the legacy software database 140, the combination layer 151 of the bundle generation engine 150 generates different combinations of the identified open-source software versions with at least a portion of the legacy software for the computing environment. In generating the combinations, the combination layer 151 analyzes one or more historical software bundles which may be stored in a database that is part of the combination layer 151. The combining of the one or more open-source software versions with at least the portion of the legacy software is based at least in part on the analysis of the one or more historical software bundles. For example, the combination layer 151 maintains statistical data of what were the best performing bundle configurations. The combination layer 151 applies previous specifications to create bundles when the intake parameters and open-source software options are the same or similar to those of the previous combinations.

A testing layer 152 tests the different combinations in the computing environment or in a simulated computing environment. A simulated computing environment can be generated based on, for example, the operating system details, device details and other intake parameters. Using the test results, the bundle defining layer 153 generates the software bundle based on the combination of legacy software and open-source software that produces the highest performance during the testing. The highest performance can be based on, for example, a minimum amount of issues with the software (e.g., low percentage of bugs, defects, crashes, stoppages, slowdowns), high performance metrics (e.g., low latency, high throughput, high input/outputs per second (IOPs)), and highest achievement of desired results as specified in the user request.

Following generation of the software bundle, an API wrapper generation layer 154 defines and adds one or more APIs to the software bundle based at least in part on the intake specifications (e.g., operating system specifications, communication protocols, networks, security specifications, etc.). For example, the APIs may correspond to at least a communication protocol such as, but not necessarily limited to, simple mail transfer protocol (SMTP), transmission control protocol (TCP), Internet message access protocol (IMAP), hypertext transfer protocol (HTTP), file transfer protocol (FCP), etc. An output layer 155 configures the software bundle for transmission over the network 104 to one or more user devices 102 including, for example, servers where the software bundle can be implemented in a computing environment such as, for example, a datacenter.

Figure 5:
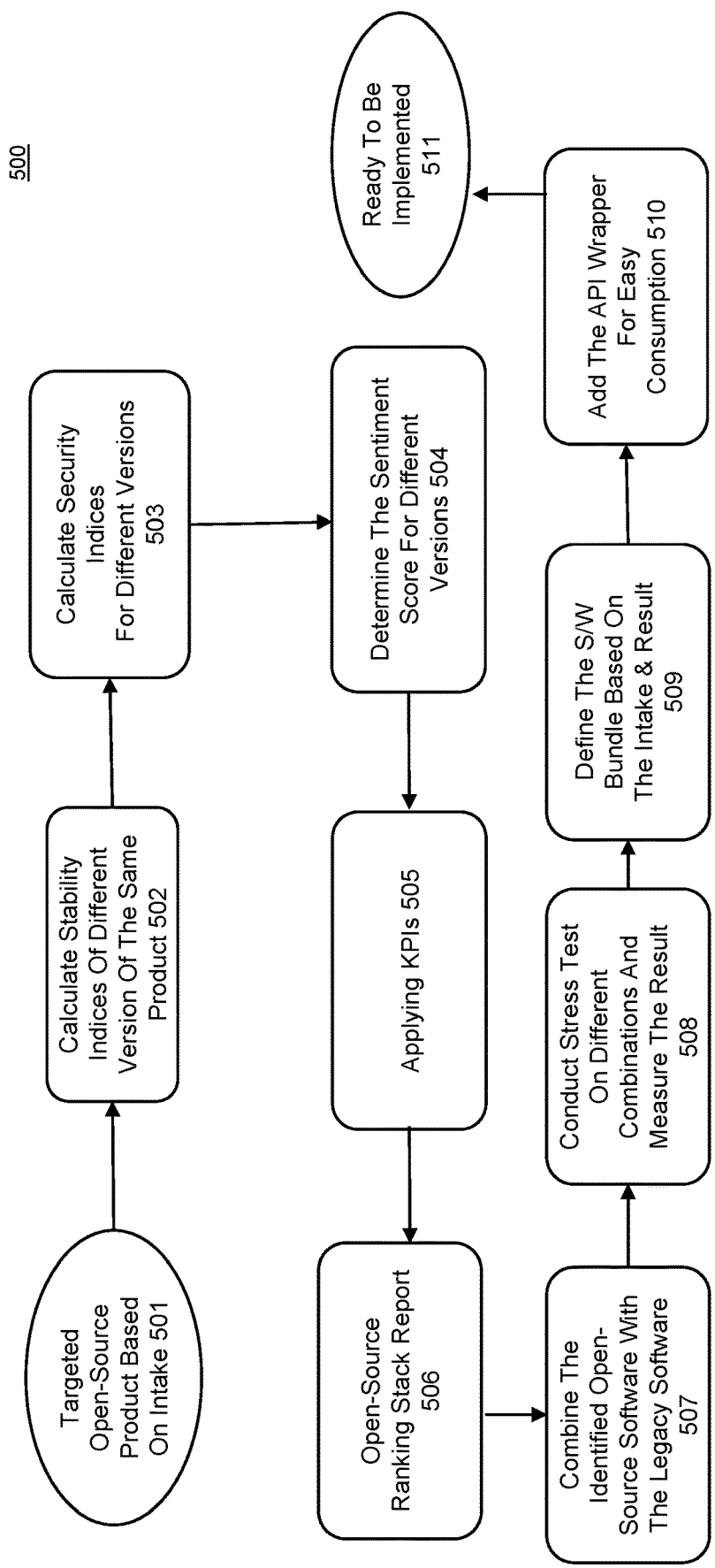
FIG. 5 depicts an operational flow for software bundle generation and delivery in an illustrative embodiment.

Referring to the operational flow 500 for software bundle generation and delivery in FIG. 5, at block 501, an open-source software product is targeted for analysis based on the intake specifications. At block 502, as described herein above, the stability index computation layer 131 calculates stability indices for different versions of the open-source software product based on the information collected by the data and parameter collection layer 121 and the open-source software collection layer 122. At block 503, as described herein above, the security index computation layer 132 calculates security indices for the different versions, and at block 504, as described herein above, the sentiment analysis layer 133 determines sentiment scores for the different versions. Based on the stability and security indices, the sentiment scores, and the application of enterprise KPIs (block 505), as described herein above, the ranking layer 134 generates a ranking at block 506 (open-source ranking stack report) of certain software versions that may be potentially used in the software bundle.

Referring to block 507, taking the identified open-source software versions from the open-source software identification engine 130 and an inventory of legacy software from the legacy software database 140, the combination layer 151 generates different combinations of the identified open-source software versions with parts of the legacy software. As noted herein above, the generation of the combinations may be based on analysis of one or more historical software bundles. Referring to blocks 508 and 509, as described hereinabove, the testing layer 152 tests the different combinations in the computing environment or in a simulated computing environment, and using the test results, the bundle defining layer 153 generates a software bundle based on the combination of legacy software and open-source software that produces the highest or high performance during the testing, and is most closely aligned or is closely aligned with the intake specifications. Referring to block 510, as described hereinabove, the API wrapper generation layer 154 defines and adds one or more APIs to the software bundle based at least in part on the intake specifications. Referring to block 511, the output layer 155 configures the software bundle for transmission over the network 104 to a corresponding computing environment so that the software bundle is ready to be implemented in the computing environment which may be, for example, a datacenter.

Figure 6:
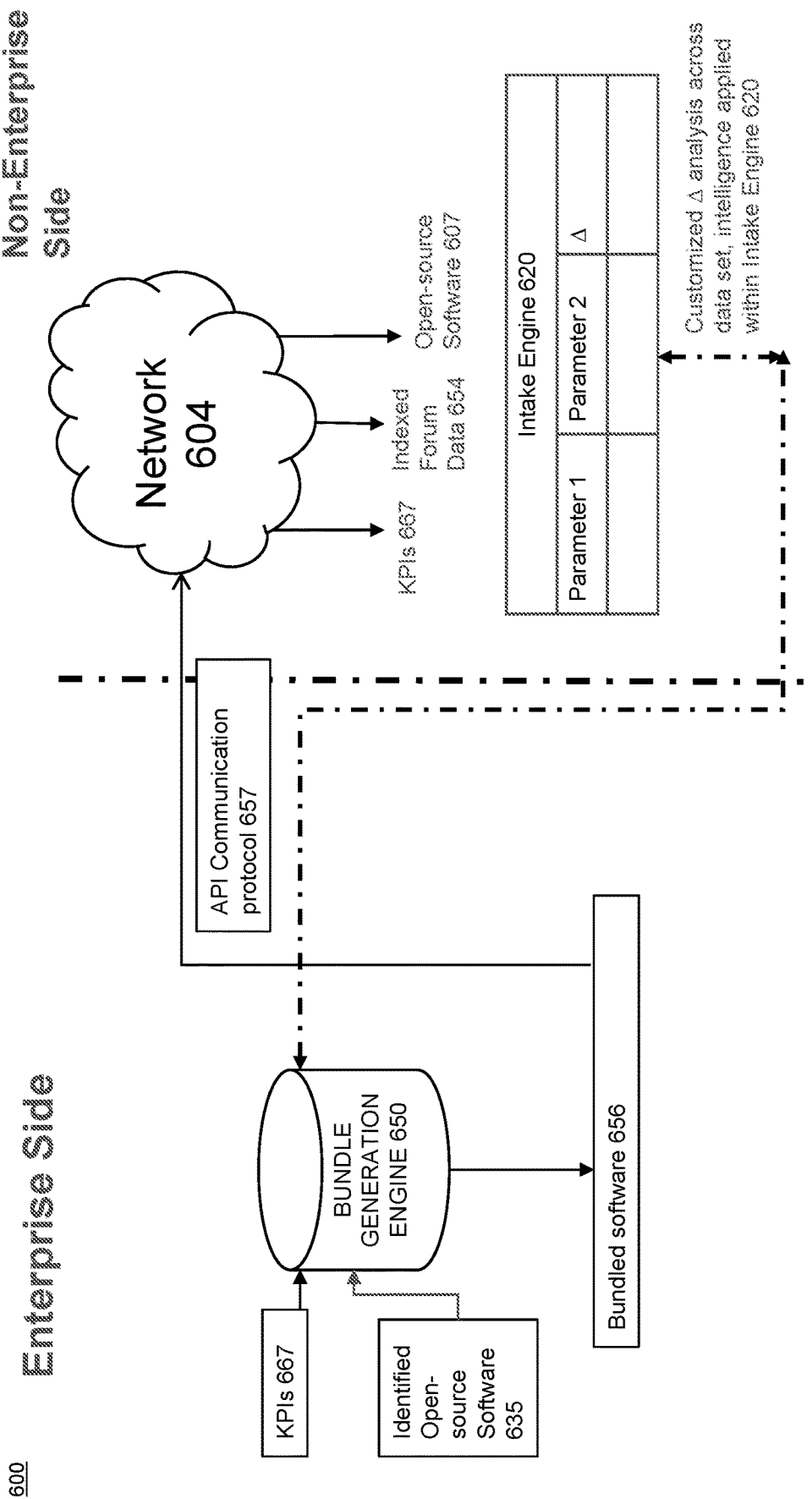
FIG. 6 depicts an architecture for software bundle generation and delivery in an illustrative embodiment.

FIG. 6 depicts an architecture 600 for software bundle generation and delivery. In an illustrative embodiment, the architecture 600 depicts an enterprise side and a non-enterprise side. It is to be understood that the embodiments are not necessarily limited to the architecture shown in FIG. 6, and that other configurations and locations of components are possible. For example, the intake engine 620 may be located on an enterprise side instead of the non-enterprise side as shown. Referring to the architecture 600, KPIs 667, indexed forum data 654 and open-source software 607 are collected via network 604 (which can be the same or similar to network 104) from one or more open-source software information sources 103 and one or more open-source software providers 105 by the intake engine 620. The intake engine 620 may be the same as or similar to the intake engine 120.

Similar to what is described herein above, in one or more embodiments, the intake engine 620 performs delta (Δ) analysis across data sets to compare data values (e.g., parameter 1 and parameter 2) between multiple objects over a designated time interval or for a single object over multiple (e.g., equivalent) time intervals. As a result, a delta analysis is performed to find variations between different combinations of intake data and parameters. Additionally, once a software bundle is generated, the intake engine 620 performs a delta analysis to determine variations between different software bundles that may include different combinations of portions and versions of open-source software and legacy software. The results of the delta analysis are provided to the bundle generation engine 650. The bundle generation engine 650 may be the same as or similar to the bundle generation engine 150.

Along with the results of the delta analysis, the bundle generation engine 650 analyzes the KPIs 667 and identified open-source software 635 from the open-source software identification engine 130 when identifying combinations of open-source software versions and legacy software. As explained herein above in connection with the bundle generation engine 150, the bundle generation engine 650 tests the identified combinations and defines a software bundle (e.g., bundled software 656) to be sent to a given computing environment over the network 604. As noted herein in connection with bundle generation engine 150, the bundle generation engine 650 defines and adds one or more APIs (e.g., API communication protocol 657) to the bundled software 656 to facilitate interfacing of the bundled software 656 with the network 604 and/or target computing environment on the external side.

In some embodiments, the legacy software database 140 and other data corpuses, repositories or databases referred to herein are implemented using one or more storage systems or devices associated with the software bundle management platform 110. In some embodiments, one or more of the storage systems utilized to implement the legacy software database 140 and other data corpuses, repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the software bundle management platform 110, the intake engine 120, open-source software identification engine 130, legacy software database 140 and/or bundle generation engine 150 in other embodiments can be implemented at least in part externally to the software bundle management platform 110, for example, as stand-alone servers, sets of servers or other types of systems coupled to the network 104. For example, the intake engine 120, open-source software identification engine 130, legacy software database 140 and/or bundle generation engine 150 may be provided as cloud services accessible by the software bundle management platform 110.

The intake engine 120, open-source software identification engine 130, legacy software database 140 and/or bundle generation engine 150 in the FIG. 1 embodiment are each assumed to be implemented using at least one processing device. Each such processing device generally comprises at least one processor and an associated memory, and implements one or more functional modules for controlling certain features of the intake engine 120, open-source software identification engine 130, legacy software database 140 and/or bundle generation engine 150.

At least portions of the software bundle management platform 110 and the elements thereof may be implemented at least in part in the form of software that is stored in memory and executed by a processor. The software bundle management platform 110 and the elements thereof comprise further hardware and software required for running the software bundle management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the intake engine 120, open-source software identification engine 130, legacy software database 140, bundle generation engine 150 and other elements of the software bundle management platform 110 in the present embodiment are shown as part of the software bundle management platform 110, at least a portion of the intake engine 120, open-source software identification engine 130, legacy software database 140, bundle generation engine 150 and other elements of the software bundle management platform 110 in other embodiments may be implemented on one or more other processing platforms that are accessible to the software bundle management platform 110 over one or more networks. Such elements can each be implemented at least in part within another system element or at least in part utilizing one or more stand-alone elements coupled to the network 104.

It is assumed that the software bundle management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or LXCs, or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the intake engine 120, open-source software identification engine 130, legacy software database 140, bundle generation engine 150 and other elements of the software bundle management platform 110, and the elements thereof can each be implemented in the form of one or more LXCs running on one or more VMs. Other arrangements of one or more processing devices of a processing platform can be used to implement the intake engine 120, open-source software identification engine 130, legacy software database 140 and bundle generation engine 150, as well as other elements of the software bundle management platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the software bundle management platform 110 to reside in different data centers. Numerous other distributed implementations of the software bundle management platform 110 are possible.

Accordingly, one or each of the intake engine 120, open-source software identification engine 130, legacy software database 140, bundle generation engine 150 and other elements of the software bundle management platform 110 can each be implemented in a distributed manner so as to comprise a plurality of distributed elements implemented on respective ones of a plurality of compute nodes of the software bundle management platform 110.

It is to be appreciated that these and other features of illustrative embodiments are presented by way of example only, and should not be construed as limiting in any way. Accordingly, different numbers, types and arrangements of system elements such as the intake engine 120, open-source software identification engine 130, legacy software database 140, bundle generation engine 150 and other elements of the software bundle management platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the software bundle management platform can be offered to cloud infrastructure customers or other users as part of FaaS, CaaS and/or PaaS offerings.

Figure 7:
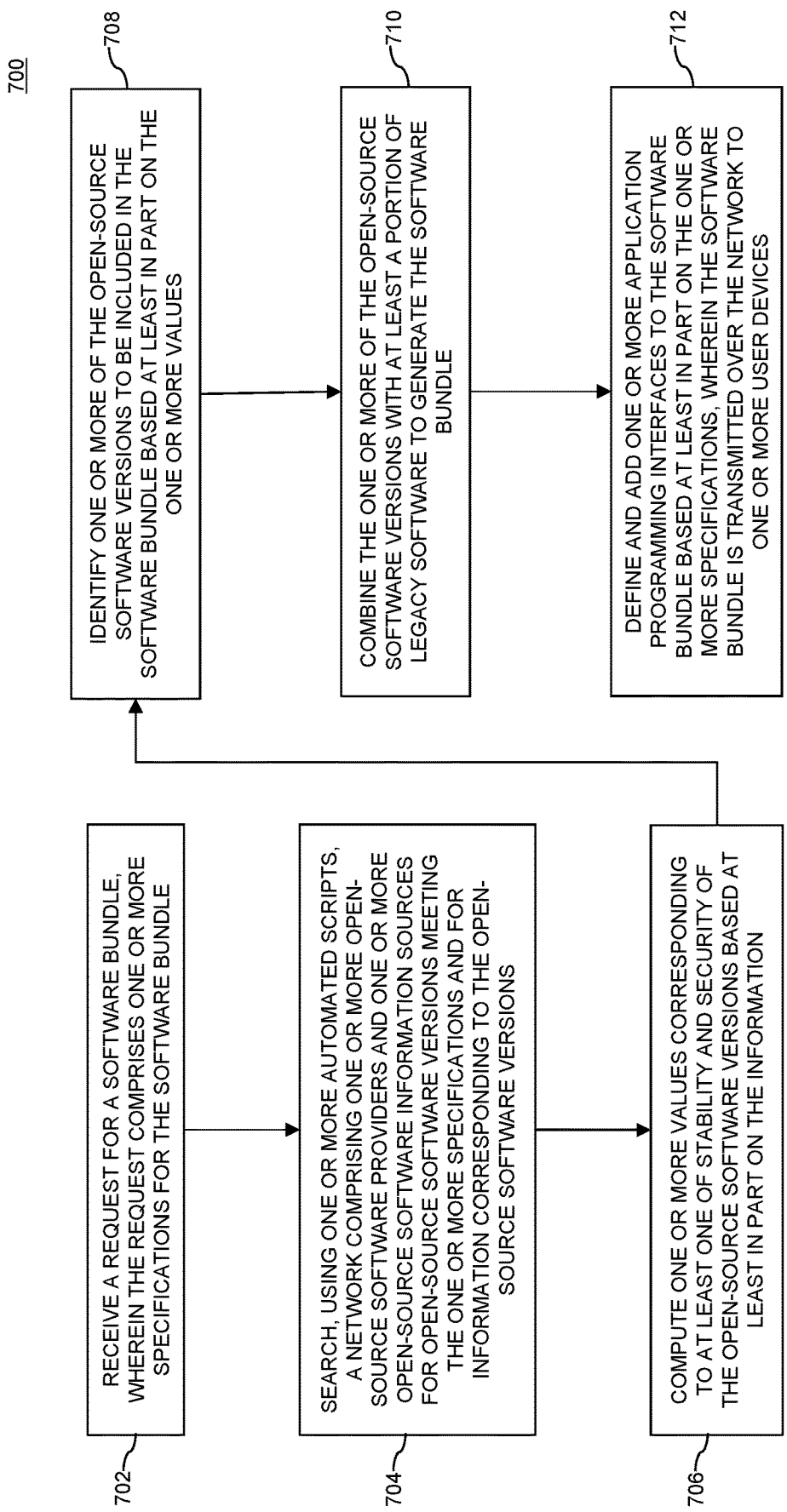
FIG. 7 depicts a process for software bundle management according to an illustrative embodiment.

The operation of the information processing system 100 will now be described in further detail with reference to the flow diagram of FIG. 7. With reference to FIG. 7, a process 700 for software bundle management as shown includes steps 702 through 712, and is suitable for use in the system 100 but is more generally applicable to other types of information processing systems comprising a software bundle management platform configured for software bundle generation and delivery.

In step 702, a request for a software bundle is received. The request comprises one or more specifications for the software bundle. The one or more specifications comprise, for example, operating system parameters, device specifications and/or functions to be performed by the software bundle.

In step 704, using one or more automated scripts, a network comprising one or more open-source software providers and one or more open-source software information sources is searched for open-source software versions meeting the one or more specifications and for information corresponding to the open-source software versions.

In step 706, one or more values corresponding to at least one of stability and security of the open-source software versions are computed based at least in part on the information. Computing the one or more values may comprise computing a stability index for respective ones of the open-source software versions, wherein computing the stability index is based at least in part on a number of open issues corresponding to the respective ones of the open-source software versions. Computing the one or more values may comprise computing a security index for respective ones of the open-source software versions, wherein computing the security index is based at least in part on a number of reported security issues for the respective ones of the open-source software versions and respective criticalities of the reported security issues. The respective criticalities are based at least in part on respective CVSS scores associated with the respective criticalities.

In step 708, one or more of the open-source software versions to be included in the software bundle are identified based at least in part on the one or more values.

In step 710, the one or more of the open-source software versions are combined with at least a portion of legacy software to generate the software bundle. One or more historical software bundles can be analyzed, wherein the combining of the one or more of the open-source software versions with at least the portion of the legacy software is based at least in part on the analysis of the one or more historical software bundles.

In step 712, one or more application programming interfaces are defined and added to the software bundle based at least in part on the one or more specifications. The software bundle is transmitted over the network to one or more user devices. The one or more application programming interfaces may correspond to at least one communication protocol.

The process may also include classifying respective sentiments of the open-source software versions based at least in part on the information. The classifying may comprise comparing at least one of one or more terms and one or more phrases used by one or more users to describe the open-source software versions to one or more key terms and one or more key phrases, and deriving at least one of a positive sentiment and a negative sentiment for respective ones of the open-source software versions based on the comparing. The classifying may also comprise retrieving from the one or more open-source software information sources data corresponding to a number of positive indications and a number of negative indications for respective ones of the open-source software versions, and computing a fulfillment value based at least in part on the number of positive indications and the number of negative indications. The classifying may also comprise retrieving from the one or more open-source software information sources data corresponding to a number of downloads for respective ones of the open-source software versions, and computing an inclination value based at least in part on the number of downloads.

The process may also include ranking the open-source software versions based at least in part on the one or more values, and executing one or more tests of the software bundle in a computing environment.

It is to be appreciated that the FIG. 7 process and other features and functionality described above can be adapted for use with other types of information systems configured to execute software bundle management services in a software bundle management platform or other type of platform.

The particular processing operations and other system functionality described in conjunction with the flow diagram of FIG. 7 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 7 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a software bundle management platform as disclosed herein can provide a number of significant advantages relative to conventional arrangements. For example, the software bundle management platform advantageously provides a data-driven statistical model that enables appropriate versions of open-source software to be implemented in a computing environment (e.g., datacenter) with existing/legacy proprietary software. Open-source software stability and security indices are determined and software sentiment analysis for open-source software is performed based on observations from various platforms. An analytics-driven report provides information about open-source products including, for example: (i) various product versions; (ii) defects/critical bugs associated with each product version; and (iii) time for each version to stabilize.

Unlike conventional approaches, illustrative embodiments provide technical solutions which offer an intelligent framework that generates a software bundle based on computing environment specifications. No manual intervention by administrators is required, and the bundles can be consumed seamlessly via automatically generated APIs (e.g., API communication protocols). As an additional advantage, the APIs are tailored to the received computing environment parameters. The embodiments provide for less downtime and better performance at a lower cost than conventional approaches by prioritizing data privacy and ownership preservation during data exchange.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the software bundle management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a software bundle management platform in illustrative embodiments. These and other cloud-based systems in illustrative embodiments can include object stores.

Illustrative embodiments of processing platforms will now be described in greater detail with reference to FIGS. 8 and 9. Although described in the context of system 100, these platforms may also be used to implement at least portions of other information processing systems in other embodiments.

Figure 8:
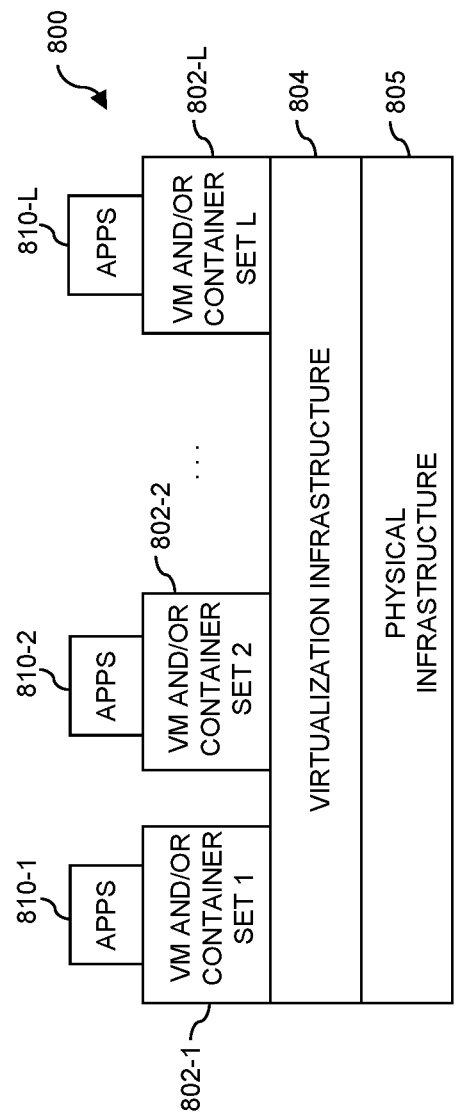
FIGS. 8 and 9 show examples of processing platforms that may be utilized to implement at least a portion of an information processing system according to illustrative embodiments.
Figure 9:
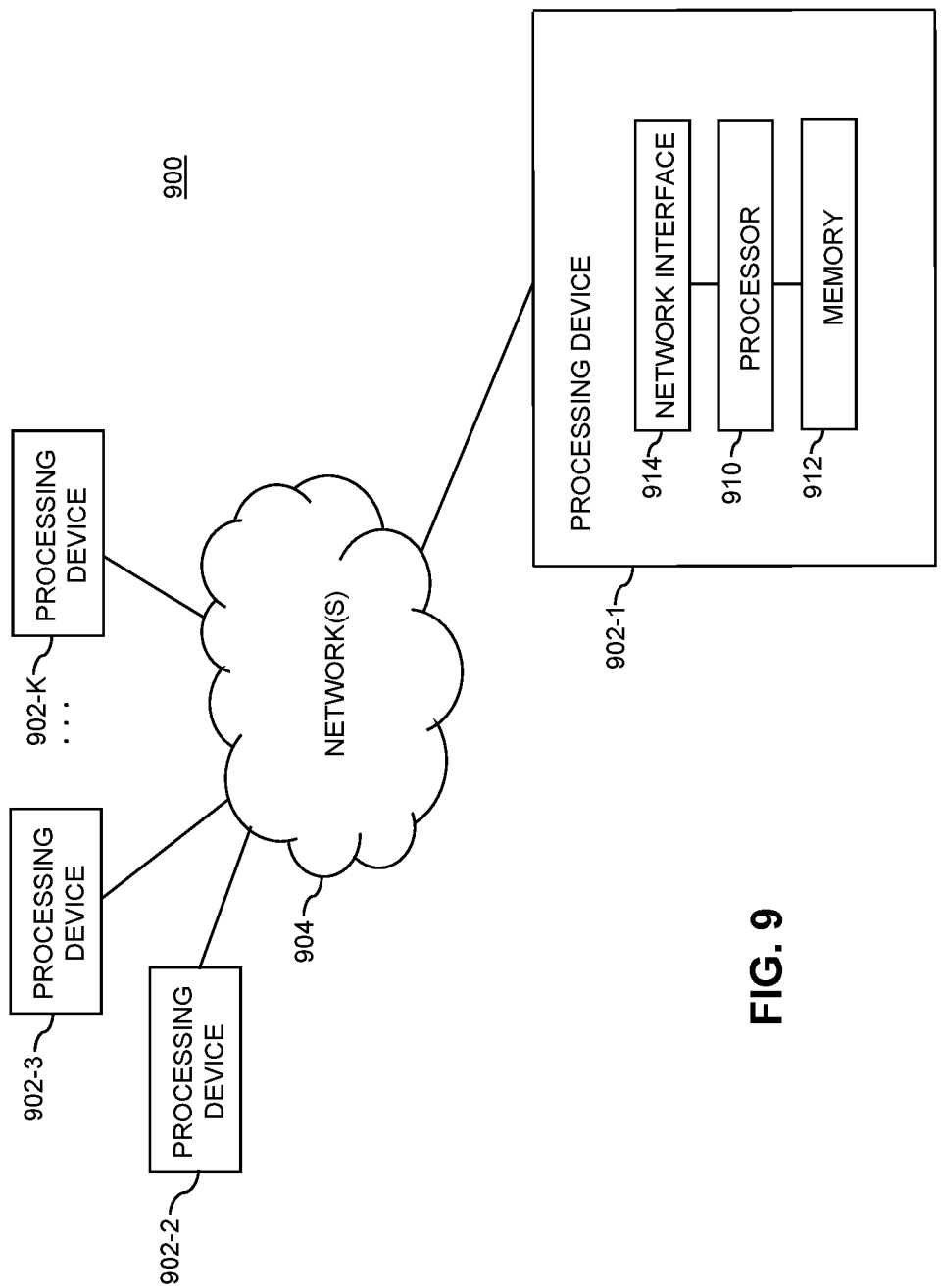

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2 . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2 . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912. The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the software bundle management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and software bundle management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
receiving a request for a software bundle, wherein the request comprises one or more specifications for the software bundle;

searching, using one or more automated scripts, a network comprising one or more open-source software providers and one or more open-source software information sources for open-source software versions meeting the one or more specifications and for information corresponding to the open-source software versions;

computing one or more values corresponding to at least one of stability and security of the open-source software versions based at least in part on the information;

identifying one or more of the open-source software versions to be included in the software bundle based at least in part on the one or more values;

combining the one or more of the open-source software versions with at least a portion of legacy software to generate the software bundle; and defining and adding one or more application programming interfaces to the software bundle based at least in part on the one or more specifications;

wherein the software bundle is transmitted over the network to one or more user devices; and wherein the steps of the method are executed by at least one processing device operatively coupled to a memory.

2. The method of claim 1 wherein the one or more specifications comprise at least one of operating system parameters, device specifications and functions to be performed by the software bundle.

3. The method of claim 1 wherein computing the one or more values comprises computing a stability index for respective ones of the open-source software versions, wherein computing the stability index is based at least in part on a number of open issues corresponding to the respective ones of the open-source software versions.

4. The method of claim 1 wherein computing the one or more values comprises computing a security index for respective ones of the open-source software versions, wherein computing the security index is based at least in part on a number of reported security issues for the respective ones of the open-source software versions and respective criticalities of the reported security issues.

5. The method of claim 4 wherein the respective criticalities are based at least in part on respective common vulnerability scoring system scores associated with the respective criticalities.

6. The method of claim 1 further comprising classifying respective sentiments of the open-source software versions based at least in part on the information.

7. The method of claim 6 wherein the classifying comprises:
comparing at least one of one or more terms and one or more phrases used by one or more users to describe the open-source software versions to one or more key terms and one or more key phrases; and
deriving at least one of a positive sentiment and a negative sentiment for respective ones of the open-source software versions based on the comparing.

8. The method of claim 6 wherein the classifying comprises:
retrieving from the one or more open-source software information sources data corresponding to a number of positive indications and a number of negative indications for respective ones of the open-source software versions; and
computing a fulfillment value based at least in part on the number of positive indications and the number of negative indications.

9. The method of claim 6 wherein the classifying comprises:
retrieving from the one or more open-source software information sources data corresponding to a number of downloads for respective ones of the open-source software versions; and
computing an inclination value based at least in part on the number of downloads.

10. The method of claim 1 further comprising ranking the open-source software versions based at least in part on the one or more values.

11. The method of claim 1 further comprising executing one or more tests of the software bundle in a computing environment.

12. The method of claim 1 further comprising analyzing one or more historical software bundles, wherein the combining of the one or more of the open-source software versions with at least the portion of the legacy software is based at least in part on the analysis of the one or more historical software bundles.

13. The method of claim 1 wherein the one or more application programming interfaces correspond to at least one communication protocol.

14. An apparatus comprising:
a processing device operatively coupled to a memory and configured:
to receive a request for a software bundle, wherein the request comprises one or more specifications for the software bundle;
to search, using one or more automated scripts, a network comprising one or more open-source software providers and one or more open-source software information sources for open-source software versions meeting the one or more specifications and for information corresponding to the open-source software versions;
to compute one or more values corresponding to at least one of stability and security of the open-source software versions based at least in part on the information;
to identify one or more of the open-source software versions to be included in the software bundle based at least in part on the one or more values;
to combine the one or more of the open-source software versions with at least a portion of legacy software to generate the software bundle; and
to define and add one or more application programming interfaces to the software bundle based at least in part on the one or more specifications;
wherein the software bundle is transmitted over the network to one or more user devices.

15. The apparatus of claim 14 wherein, in computing the one or more values, the processing device is configured to compute a stability index for respective ones of the open-source software versions, wherein computing the stability index is based at least in part on a number of open issues corresponding to the respective ones of the open-source software versions.

16. The apparatus of claim 14 wherein, in computing the one or more values, the processing device is configured to compute a security index for respective ones of the open-source software versions, wherein computing the security index is based at least in part on a number of reported security issues for the respective ones of the open-source software versions and respective criticalities of the reported security issues.

17. The apparatus of claim 14 wherein the processing device is further configured to classify respective sentiments of the open-source software versions based at least in part on the information.

18. An article of manufacture comprising a non-transitory processor-readable storage medium having stored therein program code of one or more software programs, wherein the program code when executed by at least one processing device causes said at least one processing device to perform the steps of:
receiving a request for a software bundle, wherein the request comprises one or more specifications for the software bundle;
searching, using one or more automated scripts, a network comprising one or more open-source software providers and one or more open-source software information sources for open-source software versions meeting the one or more specifications and for information corresponding to the open-source software versions;
computing one or more values corresponding to at least one of stability and security of the open-source software versions based at least in part on the information;
identifying one or more of the open-source software versions to be included in the software bundle based at least in part on the one or more values;
combining the one or more of the open-source software versions with at least a portion of legacy software to generate the software bundle; and
defining and adding one or more application programming interfaces to the software bundle based at least in part on the one or more specifications;
wherein the software bundle is transmitted over the network to one or more user devices.

19. The article of manufacture of claim 18 wherein, in computing the one or more values, the program code causes said at least one processing device to compute a stability index for respective ones of the open-source software versions, wherein computing the stability index is based at least in part on a number of open issues corresponding to the respective ones of the open-source software versions.

20. The article of manufacture of claim 18 wherein, in computing the one or more values, the program code causes said at least one processing device to compute a security index for respective ones of the open-source software versions, wherein computing the security index is based at least in part on a number of reported security issues for the respective ones of the open-source software versions and respective criticalities of the reported security issues.

* * * * *